US012499771B2

(12) United States Patent
Purica et al.

(10) Patent No.: US 12,499,771 B2
(45) Date of Patent: Dec. 16, 2025

(54) SYSTEM AND METHOD FOR FAST AND RELIABLE DETECTION OF THE COMPLEXITY OF AIR SECTORS

(71) Applicant: THALES, Courbevoie (FR)

(72) Inventors: Andrei Purica, Rungis (FR); Béatrice Pesquet-Popescu, Rungis (FR)

(73) Assignee: THALES, Courbevoie (FR)

( * ) Notice: Subject to any disclaimer, the term of this patent is extended or adjusted under 35 U.S.C. 154(b) by 408 days.

(21) Appl. No.: 18/008,437

(22) PCT Filed: May 11, 2021

(86) PCT No.: PCT/EP2021/062538

§ 371 (c)(1),
(2) Date: Dec. 5, 2022

(87) PCT Pub. No.: WO2021/249712

PCT Pub. Date: Dec. 16, 2021

(65) Prior Publication Data

US 2023/0316932 A1 Oct. 5, 2023

(30) Foreign Application Priority Data

Jun. 12, 2020 (FR) ....................................... 2006173

(51) Int. Cl.

| | |
|---|---|
| ***G08G 5/56*** | (2025.01) |
| ***G08G 5/22*** | (2025.01) |
| ***G08G 5/72*** | (2025.01) |

(52) U.S. Cl.

CPC ................. *G08G 5/22* (2025.01); *G08G 5/56* (2025.01); *G08G 5/727* (2025.01)

(58) Field of Classification Search

CPC ... G08G 5/0026; G08G 5/0043; G08G 5/0082

See application file for complete search history.

(56) References Cited

U.S. PATENT DOCUMENTS

| | | | |
|---|---|---|---|
| 2016/0042647 A1 | 2/2016 | Teramoto et al. | |
| 2017/0365178 A1* | 12/2017 | Shay .................... | G05D 1/0676 |
| 2019/0138947 A1 | 5/2019 | Cao et al. | |
| 2022/0270497 A1 | 8/2022 | Pesquet-Popescu et al. | |

FOREIGN PATENT DOCUMENTS

CN 105 206 115 B 11/2017

OTHER PUBLICATIONS

Laudeman, et al., "Dynamic density: An air traffic management metric", NASA/TM, Ames Research Center, Apr. 1998.

(Continued)

*Primary Examiner* — Ramya P Burgess
*Assistant Examiner* — Chanmin Park
(74) *Attorney, Agent, or Firm* — BakerHostetler

(57) ABSTRACT

In the field of air traffic control, a method is provided to determine a processing complexity of an ATC situation. For this purpose, the method includes grouping parameters of the paths by pairs of paths in a matrix, applying to this matrix a transformation aiming to concentrate the energy, then calculating the complexity index of the ATC situation as a function of the concentration level of the energy per component.

13 Claims, 8 Drawing Sheets

(56) References Cited

OTHER PUBLICATIONS

Netjasov, et al., "The Future Air Transport System: Looking for Generic Metrics of Complexity for Terminal Airspace", TRB 2009 Annual Meeting, 2008.
Hilburn, et al., "Toward a non-linear approach to modeling air traffic complexity", Human Performance, Situation Awareness, and Automation: Current Research and Trends HPSAA II, vols. I and II, 207, 2005.
Lahat, et al., "Multimodal data fusion: An overview of methods, challenges, and prospects", Proc. IEEE, vol. 103, No. 9, pp. 1449-1477, Sep. 2015.
Netjasov, et al., "Developing a generic metric of terminal airspace traffic complexity", Transportmetrica vol. 7, No. 5, pp. 369-394, Sep. 2011.

* cited by examiner

SYSTEM AND METHOD FOR FAST AND RELIABLE DETECTION OF THE COMPLEXITY OF AIR SECTORS

CROSS-REFERENCE TO RELATED APPLICATIONS

This application is a National Stage of International patent application PCT/EP2021/062538, filed on May 11, 2021, which claims priority to foreign French patent application No. FR 2006173, filed on Jun. 12, 2020, the disclosures of which are incorporated by reference in their entirety.

FIELD OF THE INVENTION

The present invention relates to determination of the complexity of the processing of air traffic control situations on sectors by operators, for example air traffic controllers. The present invention also relates to the definition of air sectors and the allocation of these sectors to operators.

BACKGROUND

The purpose of air traffic control systems is to make the conduct of flights safer, faster and more effective. They make it possible to prevent collisions between aircraft or dangerous situations between an aircraft and its environment (meteorological conditions, terrain, etc.). Thus, by synchronizing the aircraft traffic as finely as possible, they make it possible to ensure safe air traffic but also allow aircrafts to comply with intended flying times and to adopt paths which are as economical as possible in terms of fuel.

For this purpose, air traffic controllers receive a set of information relating to the airspace: position and predicted paths of the aircraft, the weather forecast, etc. The controllers may also communicate with the pilots of the aircraft via written messages or voice communication in order to obtain additional information when appropriate, and to give them instructions suited to the situation in order to ensure safety of the air traffic, while ensuring the best possible quality of service for the users of air transport. For example, air traffic controllers may inform the pilots of the suitable moment for landing or taking off at an airport, or conversely may instruct them to delay their approach if a runway is being used by aircraft at the initially intended time. The quality of the work of air traffic controllers is therefore essential for ensuring both safety and efficiency of air traffic.

In order to ensure that air traffic controllers are fully operational for their tasks, their work is governed by a strict regulatory code: in particular, in order to limit their fatigue, national regulations may fix a maximum number of concentrated working hours per day or per week.

The work of air traffic controllers is organized by geographical sectors. The complexity of the work to be carried out on a sector may vary according to a certain number of factors, the most important of which being the complexity of the traffic: an air traffic controller will only be able to deal effectively with a limited number of flights at the same time. In order to limit the workload of each controller, a variable number of controllers may be assigned to each sector so that each controller only deals with a situation whose complexity is low enough (for example, comprising a limited number of flights, path conflicts, optionally in relation to environmental characteristics such as the weather forecast, for example) to carry out their work correctly.

It is therefore expedient to assign a sufficient number of controllers permanently to each sector and/or to define sectors with a complexity conducive to ensuring safety and efficiency of the air traffic. At present, this assignment is carried out manually by the air traffic controller teams. However, this manual assignment has a certain number of limitations: in view of the regulatory constraints governing the work of air traffic controllers, it is not always easy to arrange a pool of air traffic controllers who can be mobilized in the event of an increase in the processing complexity of a sector, unless a large number of controllers is permanently kept in reserve, which is inefficient and expensive.

It is furthermore difficult to estimate the processing complexity of the traffic in a sector a priori: although the number of flights to be processed is the main characteristic, it does not take the interactions between the paths into account.

In order to automate the evaluation of the processing complexity of an air sector, analytical functions have been developed which make it possible to evaluate a processing complexity index of the traffic on a sector on the basis of a set of parameters (predicted positions and paths of the aircraft, weather forecast, etc.). For example, the publication "*Sector Complexity Study—SESAR* 2020", A study commissioned by the Croatia Control Ltd, Faculty of Transport and Traffic Sciences, Univ of Zagreb, July 2018 defines analytical functions making it possible to calculate an ATC complexity index on an air sector according to a set of indicators affecting the processing complexity of an air traffic control situation: number of airports, area of a sector, number of neighboring sectors, number of altitudes used, average speed of the aircraft, number of incoming flights, number of outgoing flights, number of aircraft in conflict, average convergence angle for the conflicts, density of the traffic, etc. These indicators can be combined within complex functions. The definition of analytical complexity functions has given rise to very many publications, such as Laudeman, I. V., Shelden, S. G., Branstrom, R., & Brasil, C. L. (1998). Dynamic density: An air traffic management metric, Netjasov, F., Janić, M., & Tošić, V. (2011). Developing a generic metric of terminal airspace traffic complexity. *Transportmetrica,* 7(5), 369-394., or Hilburn, B., & Flynn, G. (2005). Toward a non-linear approach to modeling air traffic complexity. *Human Performance, Situation Awareness, and Automation: Current Research and Trends HPSAA II, Volumes I and II,* 207. The publication "*Sector Complexity Study—SESAR* 2020", A study commissioned by the Croatia Control Ltd, Faculty of Transport and Traffic Sciences, Univ of Zagreb, July 2018 also lists a large number of publications dealing with calculation of the complexity of a sector.

However, these analytical functions have several disadvantages. First, the analytical functions are extremely complex, and their execution time varies according to the input parameters, in particular the number and the complexity of the paths of aircraft on a sector. For particularly important sectors, the calculation time may thus become very long, of the order of several seconds. The analytical functions calculated on a CPU thus do not make it possible to ensure a fixed and reliable response time for evaluating the complexity of a sector. In the case of complex sectors, they do not make it possible to ensure a sufficiently short execution time in order to assign controllers dynamically according to the variation of the air traffic.

There is therefore a need for a method for determining the complexity of the processing of an air sector by the controller, which can provide a reliable estimation of the processing complexity of the air sector by the controller in a restricted time with a low calculation complexity.

SUMMARY OF THE INVENTION

For this purpose, the invention relates to a method carried out by a computer, comprising: obtaining an ATC situation defined by a sector and a time period, and a set of input parameters comprising, for the sector and the time period, the paths of aircraft crossing the sector, said paths being defined by a set of path parameters comprising at least the positions of the aircraft; calculating, for each of the aircraft paths, path parameters at a set of time increments which is identical for all the paths; forming a matrix comprising, for each possible pair of paths, the parameters of the paths of the pair at said time increments; applying to said matrix a transformation having the property of concentrating the energy per component; calculating the energy per component; calculating a complexity index of the ATC situation, as a function of the concentration level of the energy per component.

Advantageously, said calculation, for each of the aircraft paths, of the positions of the aircraft at the set of time increments consists in interpolating the positions of the aircraft over the paths.

Advantageously, each row of the matrix represents a pair of paths; the columns of the matrix respectively represent, per successive time increment, the values of each of the parameters of the paths for the first then for the second path of the pair.

Advantageously, the concentration level of the energy per component is equal to the minimum number of components concentrating an energy greater than or equal to a predefined ratio of the total energy.

Advantageously, the energy level per component is defined by the index of the last component for which a derivative of the overall energy level of the components is greater than or equal to a predefined threshold.

Advantageously, the complexity index is defined by one of the following formulae:

$$C = \frac{k}{k_{max}} * [1 - (E_{c\_k} - E_{c\_(k-1)})], \text{ or}$$

$$C = \frac{k}{k_{max}} * \left[1 - \frac{(E_{c\_(k+1)} - E_{c\_(k-1)})}{2}\right]$$

where: the components are arranged by increasing energy, according to an index k=[1 . . . N]; $E_{c\_k}$ represents the sum of the energy of components, from index 1 to index k; k is the index of the last component for which the derivative of the total energy of the components is greater than or equal to a predefined threshold; $k_{max}$ is the index of the component for which the sum of the energies is greater than or equal to a predefined threshold of the total energy of the components.

The invention also relates to a computer program product comprising program code instructions for carrying out the steps of a method according to one of the embodiments of the invention when said program is executed on a computer.

The invention also relates to a system comprising: at least one input port capable of receiving, for a current ATC situation defined by a current sector and time period, a set of parameters comprising, for the current sector, the paths of aircraft crossing the sector; at least one calculation unit configured to carry out a method according to one of the embodiments of the invention in order to calculate a complexity index of the ATC situation.

Advantageously, the at least one calculation unit is configured to dynamically redefine the sectors of an airspace, on the basis of the complexity indices of the ATC situation which are calculated by said method.

Advantageously, the at least one calculation unit is configured to solve a problem of constraint optimization, aiming to minimize the total number of sectors on an airspace while ensuring that the ATC complexity index calculated for each sector and time period is less than a predefined complexity.

BRIEF DESCRIPTION OF THE DRAWINGS

Other characteristics, details and advantages of the invention will become apparent upon reading the description given with reference to the appended drawings, which are given by way of example and in which, respectively.

DETAILED DESCRIPTION

Certain acronyms commonly used in the technical field of the present application may be employed during the description. These acronyms are listed in the table below, in particular with their expression and their meaning.

| Acronym | Expression | Signification |
|---|---|---|
| ACC | Area Control Center | Regional center ensuring safety of the air traffic. |
| AOC | Aeronautical Operational Control | A set or subset of the applications used by an aircraft in order to communicate with services on the ground. |
| ATC | Air Traffic Control | Service provided by air traffic controllers on the ground in order to direct an aircraft safely on the ground. |

-continued

| Acronym | Expression | Signification |
|---|---|---|
| ATFM | Air Traffic Flow Management | Part of the air traffic management aiming to avoid congestion of the airports. |
| ATM | Air Traffic Management | Set of activities carried out in order to ensure safety and fluidity of the air traffic. |
| CPDLC | Controller-Pilot Data Link Communications | Method of communication between the controllers and the pilots, defining a set of elementary messages which may be exchanged. These messages correspond to the procedures used for air traffic control. |
| FIR | Flight Information Region | Volume in which a given control center ensures good running of the flights. In France, the FIRS intersect a flight space up to 19500 feet. |
| FL | Flight Level | In aeronautics, this designates an altitude expressed in hundreds of feet above the isobaric surface 1013.25 hPa. |
| GPS | Global Positioning System | System for satellite positioning. |
| GRIB | GRIdded Binary | File format used for broadcasting meteorological prediction data. The GRIB is standardized by the World Meteorological Organization (WMO). |
| NAS | Network Accessed Server | Autonomous fileserver which is connected to a network and the data of which are remotely accessed. |
| SIGMET | SIGnificant METeorological Information | A type of message intended for aircraft in flight, indicating highly dangerous observed or predicted meteorological phenomena. |
| UIR | Upper Information Region | A flight information region covering, in France, the airspace located above 19500 feet. |
| VCS | Voice Communication Systems | Systems for voice communication which are used in air traffic. |

Figure 1:
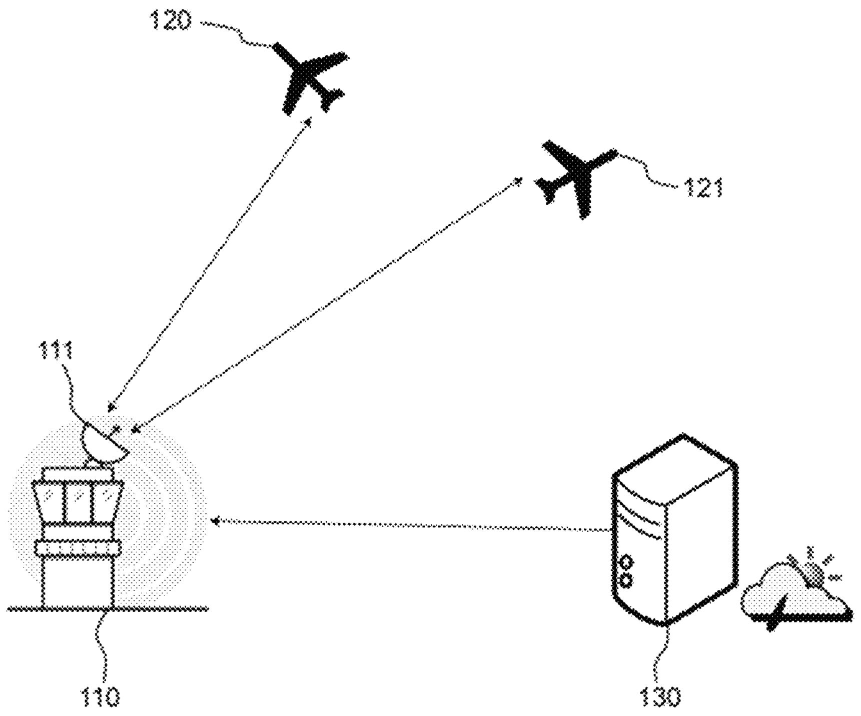
FIG. 1 represents an air traffic control system in which the invention may be implemented.

FIG. 1 represents an example of an air traffic control system in which the invention may be implemented.

The air traffic control system represented in FIG. 1 comprises a control tower 110 equipped with a radar 111 making it possible to locate the aircraft 120, 121 flying in a given sector. The control tower 110 can communicate with the aircraft, for example via a radio link, in order to give information and instructions to the aircraft, as well as to receive information and requests from the aircraft. In order to provide the aircraft with the most relevant instructions, the control tower may receive data from external providers, such as a meteorological server 130. An air traffic controller may thus provide indications and instructions to the pilots of the aircraft on the basis of a set of data comprising the intended paths of the aircraft on their sector, the interactions with the pilots, and environmental data such as meteorological predictions.

The system of FIG. 1 is given solely by way of nonlimiting example, and the invention may be implemented in many systems for air traffic control, such as ATC or ATFM systems.

Figure 2:
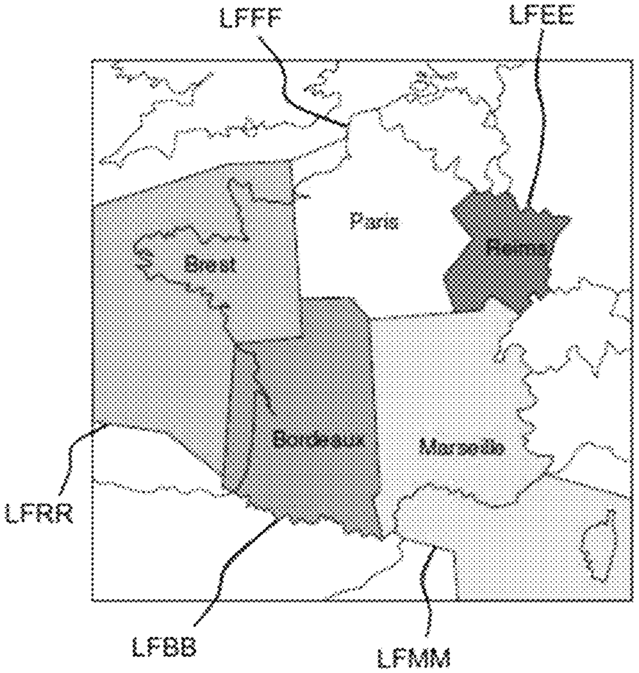
FIG. 2 represents a set of sectors on which the invention may be implemented.

FIG. 2 represents a set of sectors on which the invention may be implemented.

An airspace is said to be controlled when the maneuvers of the aircraft are subject to clearance, that is to say authorization by an air traffic controller. FIG. 2 represents the airspace controlled in France. The territory of Metropolitan France is controlled by five control centers, each controlling an FIR:

the Bordeaux center controls the FIR LFBB;

the Reims center manages the FIR LFEE;

the Paris center manages the FIR LFFF;

the Marseilles center manages the FIR LFMM;

the Brest center manages the FIR LFRR.

The FIR cover an airspace up to 19500 feet in France; above this, there is a UIR managed by the 5 control centers. These regions are in turn divided into control sectors, for example the area control centers (ACCs). Each of the sectors is continuously crossed by a certain number of aircraft. As explained above, the processing complexity of the air traffic on a sector may vary according to the number of aircraft in each sector, as well as other characteristics such as the weather, or the traffic density. So that the controllers can carry out their control operations under good conditions, the number of controllers assigned to a sector may be varied according to the complexity of its traffic. The shape and the size of the sectors may also be adjusted.

Figure 3:
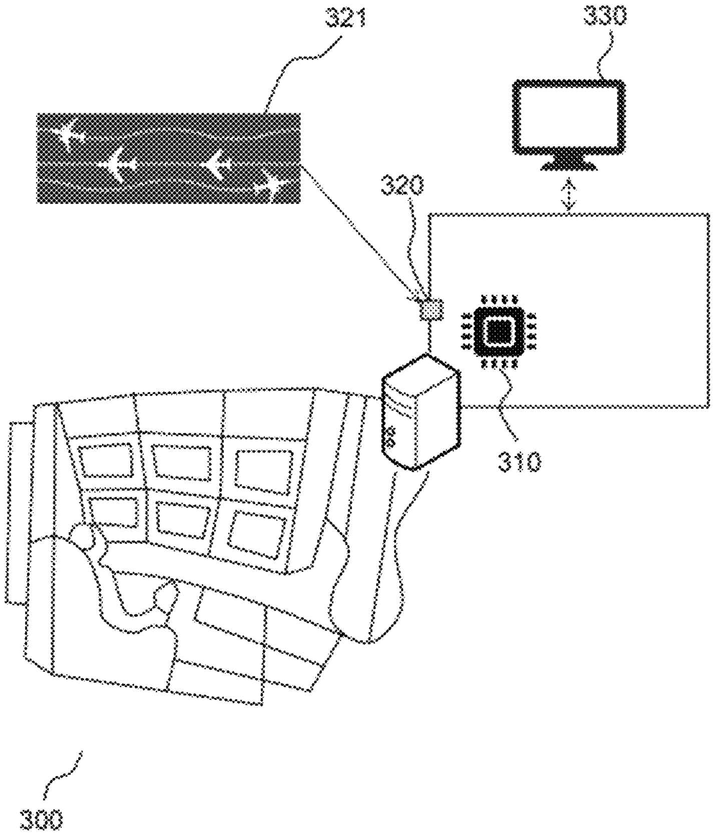
FIG. 3 represents a system for calculating the processing complexity of an ATC situation, in a set of embodiments of the invention.

FIG. 3 represents a system for calculating the processing complexity of an ATC situation, in a set of embodiments of the invention.

The system 300 may for example be an ATM, ATC or ATFM system, allowing the air traffic controllers to control the air traffic situation on a given sector.

The system 300 is a calculation system. According to a set of embodiments of the invention, the system 300 may be a single calculation device such as a computer, a server, or any other system capable of performing computer calculations. The system 300 may also include a plurality of calculation devices. For example, the system 300 may be a server farm including a plurality of calculation servers.

The system 300 thus comprises at least one calculation unit 310. The at least one calculation unit 310 may be any type of calculation unit capable of performing computer calculations. For example, the calculation unit may be a processor configured with machine instructions, a microprocessor, an integrated circuit, a microcontroller, a programmable logic circuit, or any other calculation unit capable of being programmed to perform calculation operations.

The system 300 comprises at least one input port 320 capable of receiving a set of parameters relating to a current air traffic situation on a sector. The set of input parameters comprises the paths 321 of aircraft crossing the sector.

According to various embodiments, these paths may comprise instantaneous paths and/or predicted paths.

According to various embodiments, other types of input parameters may be received, such as meteorological information. This meteorological information may, for example, consist of an indication that a given event (storm, thunderstorm, etc.) is taking place. For example, a "storm" event may be defined when the parameters of the meteorological messages associated with a storm exceed a predefined threshold.

The input parameters may be received in various ways. For example, the paths of the aircraft may be received by radio communication with the aircraft, by means of radar measurements, etc. The meteorological information may, for example, be received by means of measurements from a meteorological radar, by subscribing to a meteorological service.

For this purpose, the at least one port 320 may be of various types: Internet connection, radio link, etc. The invention is not restricted to one type of input port, and the person skilled in the art may adjust the reception of the input parameters to the available input channels. Likewise, according to various embodiments of the invention, the various input parameters may be received on a single port, or a plurality of ports of the same type or different types. For example, the aircraft paths 321 may be received via a radio link and the meteorological information may be received via an Internet connection.

The aircraft paths 321 may be expressed in various ways. For example, the paths may be expressed in the form of 4D paths with waypoints defined by a latitude, longitude, an FL and a time of passing. The paths may also comprise an associated heading for each waypoint. A path may also be associated with a type of airplane and/or a callsign (designation of a given aircraft).

These parameters correspond to real situations occurring in sectors during the time periods in question. For an ATC situation defined by a given pair (sector, time period), they thus define the input parameters representative of the processing complexity of the sector. As indicated above, these parameters comprise the paths of aircraft which have crossed the sector.

The at least one calculation unit 310 is also configured to calculate an ATC complexity index of the current situation on the basis of the input parameters.

One of the objectives of the system 300 is, in particular, to provide a reliable ATC complexity calculation capable of being executed in a restricted time by exploiting the limited calculation capacities. For this purpose, the at least one calculation unit 310 is configured to execute the steps of a method according to the invention, for example the method 400 described with reference to FIG. 4.

Once the ATC complexity index has been calculated, the system 300 may use it in various ways. For example, it may display it to at least one operator, for example an air traffic controller, by means of at least one screen 330. This allows the operator to check that the number of air traffic controllers assigned to a given situation/a given sector is sufficient according to their complexity. They may also raise an alarm, either if the ATC complexity of a situation is too high in relation to the number of controllers assigned to processing it, or if it is too low, in which case there are too many air traffic controllers mobilized for this situation.

In a set of embodiments of the invention, the at least one calculation unit 310 is configured to dynamically redefine the shape and the size of the sectors, in order to form a number of sectors which is as low as possible while ensuring that the ATC complexity of each sector is less than a predefined threshold.

This may, for example, be achieved if the at least one calculation unit is configured to solve a constraint optimization problem, aiming to minimize the number of sectors with the constraint that the ATC complexity of each sector is less than or equal to a predefined complexity threshold. This complexity threshold may, for example, be a threshold above which the sector becomes too complex to be processed by one air traffic controller.

At each iteration of the optimization, the ATC complexity of a situation represented by a sector may be calculated. This therefore makes it possible to solve a constraint optimization problem while recalculating the complexity for each sector and time period at each iteration. It also allows dynamic allocation of the air sectors. For example, the sectoring of the air space may be redefined by periods of one hour.

This makes it possible to arrange a number of sectors which is as low as possible, and thus to limit the number of controllers required for processing them, while ensuring that they can be processed correctly by the controllers. It also makes it possible to predict dynamically the number of controllers who will need to be assigned to an air space for each time period.

The complexity calculations may also be used to train a machine learning engine capable of automatically determining the complexity of an ATC situation. For example, the Applicant has filed the French patent application No. 1908722 describing the training of a supervised machine learning engine for predicting a complexity of an ATC situation on the basis of the various elements of the situation. The calculation of the complexity according to the invention may be used as a complexity to be predicted in this context.

Figure 4:
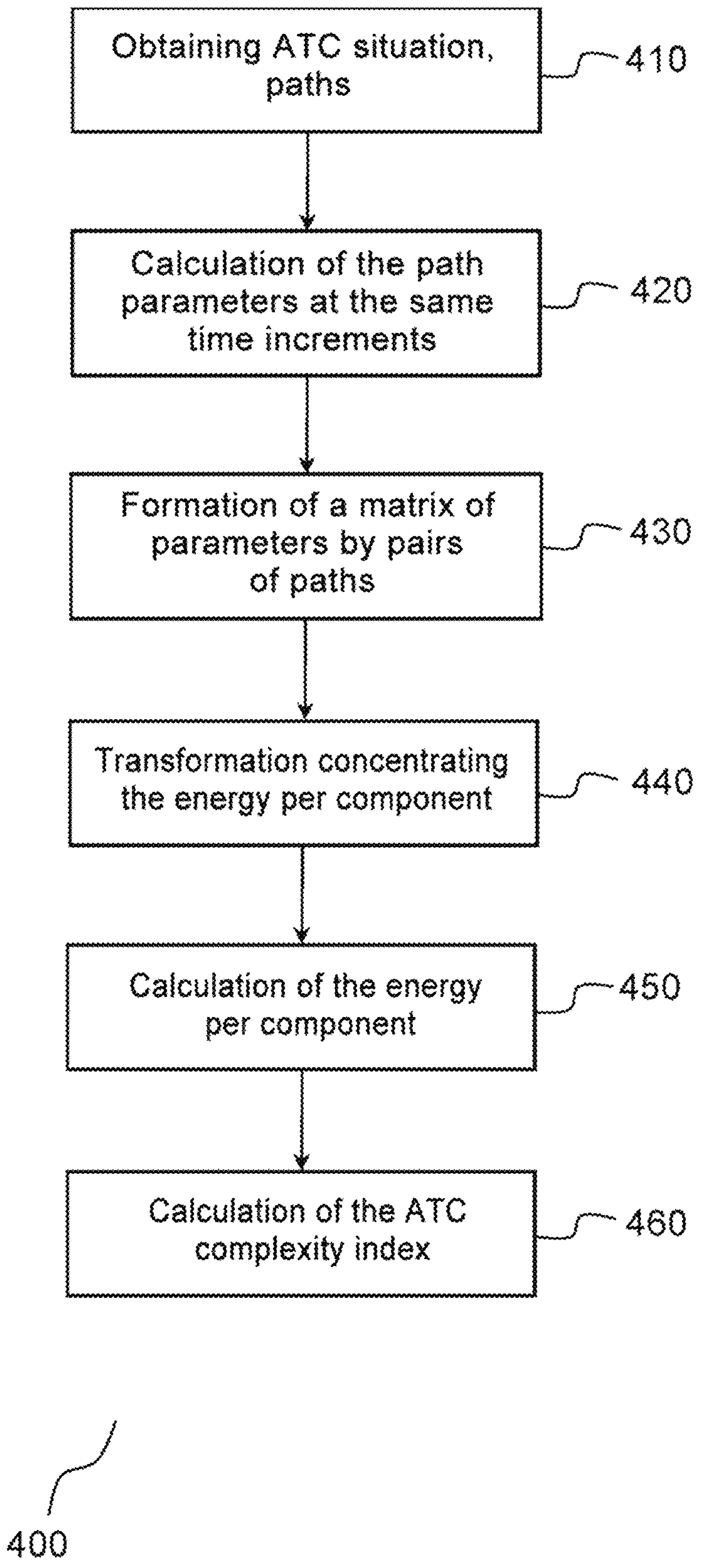
FIG. 4 represents a method carried out by a computer for calculating the processing complexity of an ATC situation, in a set of embodiments of the invention.

FIG. 4 represents a method carried out by a computer for calculating the processing complexity of an ATC situation, in a set of embodiments of the invention.

The method 400 may for example be carried out by the system 300, and all the embodiments discussed with reference to FIG. 3 are applicable to the method 400.

The method 400 comprises a first step 410 of obtaining 410 an ATC situation 340 defined by a sector and a time period, and a set of input parameters comprising, for the sector and the time period, the paths of aircraft 321 crossing the sector. The paths of the aircraft are defined by a set of path parameters comprising at least the positions of the aircraft. In a set of embodiments of the invention, they may also comprise other parameters such as the horizontal and vertical speeds, the temperature, etc. The input parameters may also comprise elements other than the aircraft paths, such as meteorological information.

This step 410 may, according to various embodiments of the invention, consist in receiving in real time the description of a current ATC situation (sector, time period, path of aircraft crossing the sector) from an air traffic control system. It may also consist in obtaining the description of a past situation, for example by extracting this information from a database of past situations.

The method 400 comprises a second step 420 of calculating, for each of the aircraft paths, path parameters at a set of time increments which is identical for all the paths.

This step consists in determining, for a given set of time increments, the parameters of each aircraft at the time increment. Specifically, the paths may initially be described by parameters at times which are variable for each aircraft. This step 420 therefore makes it possible to obtain the parameters of the aircraft at the same time increments for all the aircraft. For example, it makes it possible to compare the positions of the aircraft at identical time intervals, and therefore to identify potential path conflicts better.

The time increments may be obtained in various ways. For example, the duration of the ATC situation may be sampled by regular time increments, either as a function of a target duration of the time increments (the duration of the time increments is then predefined, but the number of time increments is not), or by dividing the duration of the situation by a given number of time increments (the number of time increments is then predefined, but the duration of the time increments is not).

Figure 5:
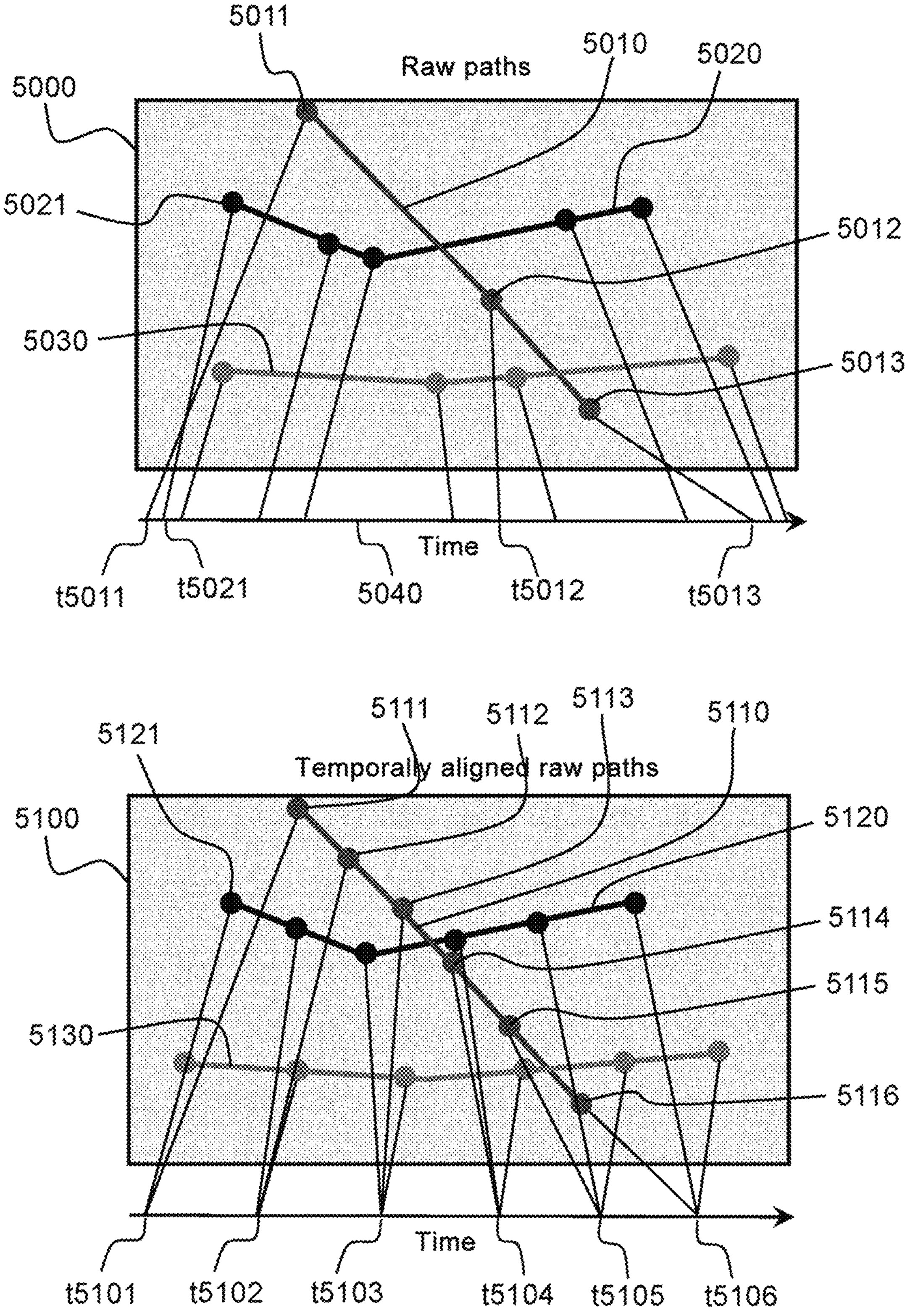
FIG. 5 represents an example of calculating positions of the paths of aircraft according to a set of common time increments, in a set of embodiments of the invention.

FIG. 5 represents an example of calculating positions of the paths of aircraft according to a set of common time increments, in a set of embodiments of the invention.

The graph 5000 represents three raw paths 5010, 5020 and 5030. In order to facilitate understanding, the paths are represented in two dimensions and the time associated with each of the positions defining the path is represented on the time axis 5040. The positions defining the path are represented by circles, and a thin line starting from the circle indicates the associated time on the time axis 5040. Of course, the invention is applicable to 3D paths associated with time information (or a 4D path, in which case the positions of the aircraft may be defined by a latitude, a longitude, and altitude and time information).

For example, the path 5010 is defined by the points 5011, 5012 and 5013 respectively associated with the times $t_{5011}$, $t_{5012}$ and $t_{5013}$. The graph 5000 shows that the times associated with the positions on the paths 5020 and 5030 are not the same. For example, the position 5021 of the path 5020 is associated with the time $t_{5021}$ which is different, although close, to the time $t_{5011}$.

This difference between the times at which the positions of the aircraft are provided for the various paths makes it more difficult to characterize the position conflicts between aircraft.

The step 420 therefore consists in converting the representation of the paths into a set of positions aligned temporally with the same time increments.

In the example of FIG. 5, the graph 5100 represents these temporally aligned paths 5110, 5120 and 5130 corresponding respectively to the paths 5010, 5020 and 5030. The time axis 5140 is identical to the time axis 5040. The paths 5110, 5120 and 5130 are each defined by the same number of positions aligned with the same time increments, in the case in point the time increments $t_{5101}$, $t_{5102}$, $t_{5103}$, $t_{5104}$, $t_{5105}$ and $t_{5106}$.

For example, the path 5110 is now defined by the positions 5111, 5112, 5113, 5114, 5115 and 5116 aligned with the time increments $t_{5101}$, $t_{5102}$, $t_{5103}$, $t_{5104}$, $t_{5105}$ and $t_{5106}$.

The positions of the paths 5110, 5120 and 5130 may be obtained in various ways on the basis of those of the paths 5010, 5020 and 5030. For example, by interpolation of the path with respect to the known positions on the paths 5010, 5020 and 5030. This interpolation may be carried out in various ways, for example via a linear interpolation or B-splines.

This representation of the paths provides much more relevant information relating to the proximity of the aircraft paths. For example, the positions 5111 and 5121 directly provide information relating to the relative proximity of the aircraft on the paths 5110 and 5120 because they are aligned with the same time increment $t_{5101}$, which was not the case for the positions 5011 and 5021.

In a set of embodiments of the invention, other parameters of the paths are known in addition to the raw paths 5010, 5020 and 5030, and are determined (for example interpolated) at the times $t_{5101}$, $t_{5102}$, $t_{5103}$, $t_{5104}$, $t_{5105}$ and $t_{5106}$ for the paths 5110, 5120 and 51030. For example, this may be the case for the horizontal and vertical speeds of the aircraft, for their heading, or the outside temperature. These parameters may for example contribute to obtaining a better estimation of the paths at various times, and therefore to obtaining a better estimation of the conflicts. Other parameters may be calculated directly on the positions of the temporally aligned paths 5110, 5120 and 5130. These are for example the number of conflicts, the distance or the minimum separation between two aircraft.

Returning to FIG. 4, the method 400 comprises a third step 430 of forming a matrix comprising, for each possible pair of paths, the parameters of the paths of the pair at said time increments.

This step consists in inserting the parameters at the same time increments into a matrix for each of the pairs. Thus, if N paths are present in the sector, each path forms N−1 pairs with the N−1 other paths, respectively, and the total number of pairs is equal to N*(N−1)/2. For each of the pairs, the parameters of the two paths of the pair are recorded for each of the time increments. Thus, at each time increment, each parameter of a path will be recorded in the matrix N−1 times (for each of the N−1 pairs that the path forms).

Figure 6:
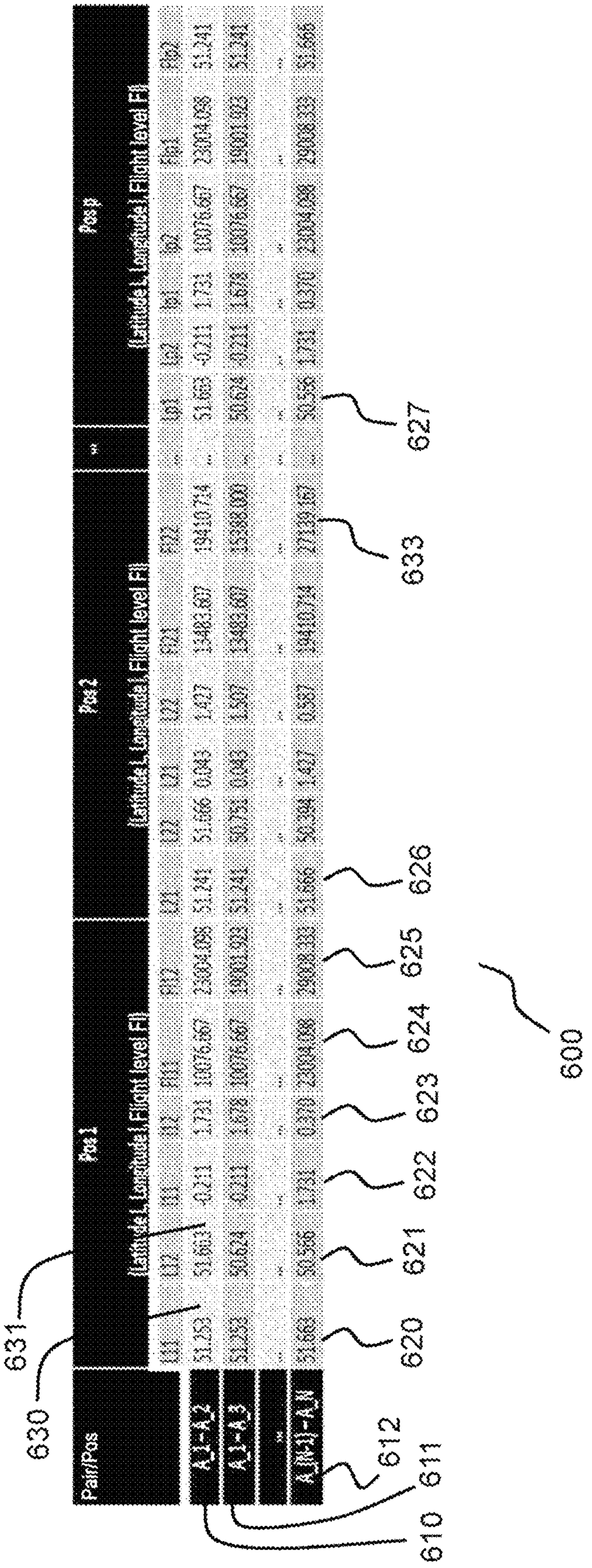
FIG. 6 represents an example of a matrix of parameters by pairs of paths, according to a set of embodiments of the invention.

FIG. 6 represents an example of a matrix of parameters by pairs of paths, according to a set of embodiments of the invention.

The matrix 600 represents the parameters of the paths at the time increments, organized by pairs of paths. In this example, N paths denoted A1, A2, . . . AN are present on the sector. The parameters of the paths comprise only the position parameters: longitude, latitude, altitude (in the form of an FL—Flight Level) for each of the time increments. The number of time increments is equal to p. Only the positions being taken into account, these various time increments/positions are denoted Pos1, Pos2 . . . Posp.

Each row corresponds to one pair of paths. For example, the rows 610, 611, 612 correspond respectively to the pairs of paths (A1, A2), (A1, A3) and (AN−1, AN).

The columns are grouped by successive time increments/positions. For each of the successive time increments/positions, the columns successively represent the latitude of the point at the time increment for the first and the second path of the pair, the longitude of the point at the time increment for the first and the second path of the pair, then the flight level of the point at the time increment for the first and the second path of the pair.

For the sake of intelligibility, only the first, second and last rows and columns of the matrix 600 are represented in FIG. 6.

For example:

column 620 represents the latitude of the first path of each pair at the first time increment;

column 621 represents the latitude of the second path of each pair at the first time increment;

column 622 represents the longitude of the first path of each pair at the first time increment;

column 623 represents the longitude of the second path of each pair at the first time increment;

column 624 represents the flight level of the first path of each pair at the first time increment;

column 625 represents the flight level of the second path of each pair at the first time increment.

The following columns then contain the parameters at the subsequent time increments/positions. For example:

- column 626 represents the latitude of the first path of each pair at the second time increment;
- column 627 represents the latitude of the second path of each pair at the second time increment.

Thus, for example:

- cell 630, located on the first column 620 and the first row 610, represents the value of the latitude of the first path A1 of the first pair (A1, A2) at the first time increment p1;
- cell 631, located on the second column 621 and the first row 610, represents the value of the latitude of the second path A2 of the first pair (A1, A2) at the first time increment p1;
- the cell located on the first column 620 and the second row 611 represents the value of the latitude of the first path A1 of the second pair (A1, A3) at the first time increment p1. Its value is therefore equal to that of cell 630;
- cell 633, located on the last column corresponding to the second time increment/position and the last row 612, represents the value of the flight level of the second path AN of the second pair (AN−1, AN) at the second time increment p2.

FIG. 6 is provided only by way of an example of a matrix of parameters according to the invention. Other representations are, however, possible.

More generally, for example, the order of the parameters or pairs of paths may be modified (for example, the columns representing the longitude could precede those representing the latitude, and the pairs of parts may be interchanged). More generally, parameters other than the path (horizontal speed, vertical speed, heading, etc.) may be used, and the matrix may be defined in such a way that:

- each row of the matrix represents a pair of paths;
- the columns of the matrix respectively represent, by successive time increments, the values of each of the parameters of the paths for the first then for the second path of the pair.

This matrix representation makes it possible to arrange values representative of a possible path conflict side-by-side. For example, the adjacent cells 630 and 631 represent the latitudes of positions of two aircraft in the sector at the same instant. Furthermore, a matrix such as the matrix 600 comprises all the information concerning an air sector in a single matrix.

In a set of embodiments of the invention, the parameters of the aircraft for each pair of paths and each time increment are concatenated in a single vector of dimension 6 (when 3 parameters latitude, longitude, altitude are taken into account, or more generally 2 times the number of parameters). In this case, the matrix is a tensor of dimensions N(N−1)/2, p, and 6 (when 3 parameters latitude, longitude, altitude are taken into account, or more generally 2 times the number of parameters).

Finally, the representation of the matrix may be adjusted. For example, the rows and columns could be reversed—there would then be one column per pair of paths and one row per parameter of a path of a pair at a time increment.

Returning to FIG. 4, the method 400 comprises a fourth step 440 of applying to the matrix a transformation having the property of concentrating the energy per component.

This transformation may, for example, be a principal component analysis (PCA) or an independent component analysis (ICA).

In a set of embodiments of the invention, a so-called IVA analysis (Independent Vector Analysis) may be used. An IVA is described in particular by D. Lahat, T. Adali and C. Jutten, "*Multimodal data fusion: An overview of methods, challenges, and prospects,*" *Proc. IEEE*, vol. 103, no. 9, pp. 1449-1477, September 2015, and is particularly appropriate when the matrix is in the form of a tensor.

In general, such a transformation makes it possible to transform the information into independent components, which are determined so as to concentrate the energy on the first components.

The method 400 then comprises a fifth step 450 of calculating the energy per component.

This step consists in calculating an energy value for each of the components of the transformed matrix.

The energy of a component may, for example, be calculated as the sum of the squares of the elements of the component.

The method 460 then comprises a sixth step of calculating a complexity index of the ATC situation, as a function of the concentration level of the energy per component.

This step consists in determining at which point the energy is concentrated on the first components, and deducing the complexity of the situation therefrom. In general, if the energy is highly concentrated on a few components, this means that all the information contained in the interactions between the pairs of paths may be summarized over a small number of dimensions, which indicates a low complexity of the situation. If many paths are parallel, for example, the information may be summarized in few dimensions and the processing complexity of the ATC situation is low. Conversely, if the energy is not very concentrated and is distributed over many components, this means that the interactions between the paths require many dimensions in order to be represented correctly, which implies many path conflicts and a high complexity of the ATC situation.

In general, the components may be sorted by increasing order of energy.

In a set of embodiments of the invention, the concentration level of the energy is defined by a number K of principal components which concentrate a ratio of the total energy of the components greater than or equal to a predefined threshold P_K. For example, the concentration level of the energy may be defined by the number of components concentrating 99% of the total energy of the components.

This allows a calculation of the concentration of the energy which is both simple and efficient.

Once this concentration level of the energy has been obtained, the index may be obtained in various ways. For example, it may simply be the number of components necessary in order to exceed the predefined energy threshold P_K.

Figure 7A:
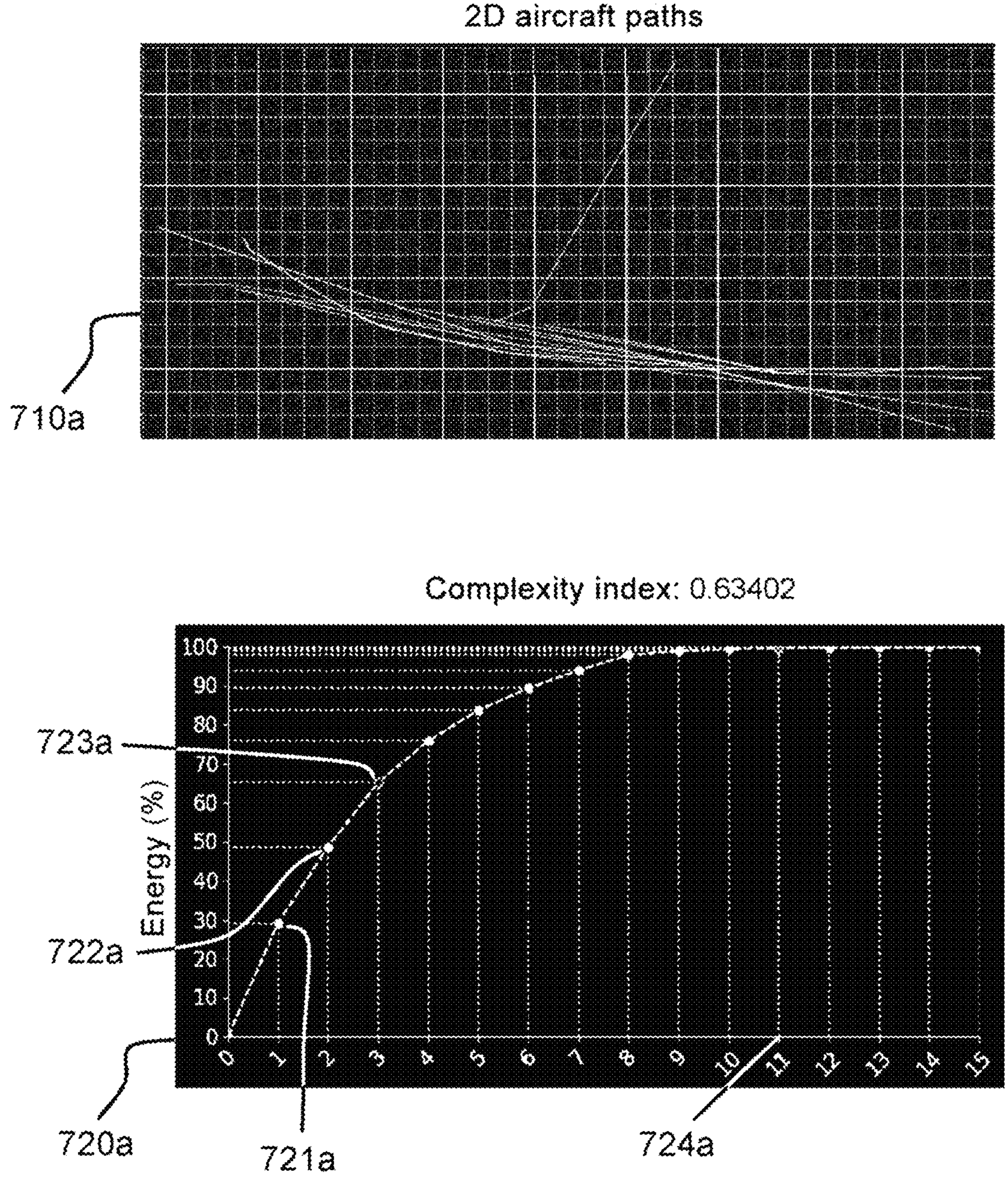
FIG. 7*a* represents an example of calculating the complexity of a first ATC situation, in a set of embodiments of the invention.
Figure 7B:
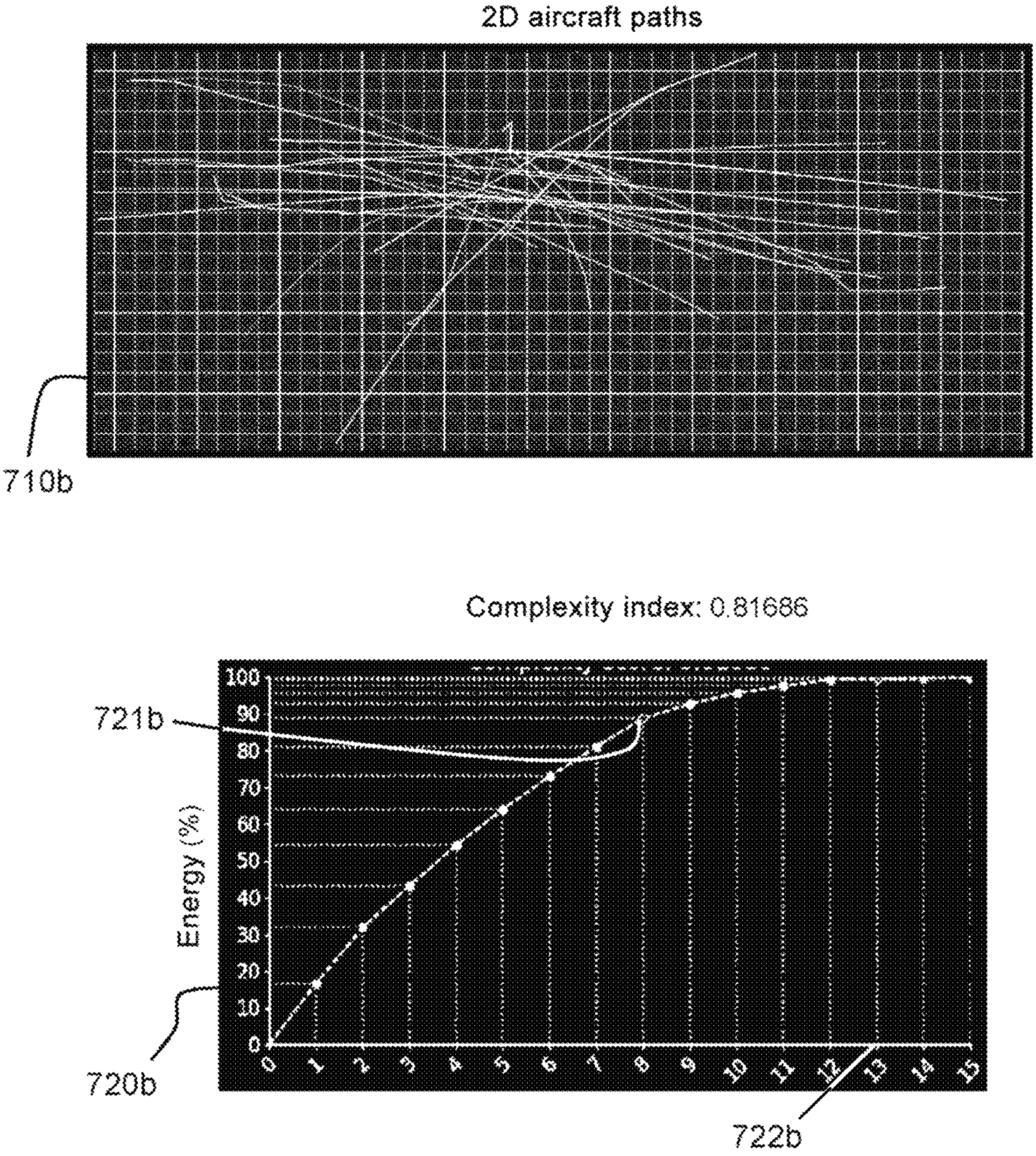
FIG. 7*b* represents an example of calculating the complexity of a second ATC situation, in a set of embodiments of the invention.

FIGS. 7*a* and 7*b* represent two examples of calculating the complexity, respectively of a first and a second ATC situation, in a set of embodiments of the invention.

In a set of embodiments of the invention, the energy level per component is defined by the index of the last component for which a derivative of the overall energy level of the components is greater than or equal to a predefined threshold. In other words, when the components are arranged by increasing amount of energy, the contribution of each component to the overall energy level decreases as the index of the components increases. Thus, the derivative of the overall energy level (sum of the energy levels from the first component to the current component) decreases with the increase of the indices of the components. This criterion therefore consists ultimately in determining the number of components contributing significantly to the overall energy.

In a set of embodiments of the invention, the processing complexity of the ATC situation is thus defined by the following formula:

$$C = \frac{k}{k_{max}} * [1 - (E_{c\_k} - E_{c\_(k-1)})]$$

where:

the components are arranged by increasing energy, according to an index k=[1 . . . N];

$E_{c\_k}$ represents the sum of the energy of components, from index 1 to index k;

k is the index of the last component contributing a large amount of energy, that is to say the component with the highest k such that the derivative of the total energy of the components, represented by $E_{c\_k}-E_{c\_(k-1)}$, is greater than or equal to a predefined threshold;

$k_{max}$ is the index of the component for which the sum of the energies is greater than or equal to a predefined threshold of the total energy.

This calculation therefore makes it possible to determine the complexity of the ATC situation as a function of the number of components providing a significant contribution to the total energy. It therefore allows a very reliable estimation of the processing complexity of the situation.

In a set of embodiments of the invention, the derivative may be a central derivative, and not a derivative on the right, the formula then becoming:

$$C = \frac{k}{k_{max}} * \left[1 - \frac{(E_{c\_(k+1)} - E_{c\_(k-1)})}{2}\right]$$

FIG. 7*a* represents a first application of this calculation, to a first ATC situation.

The illustration 710*a* provides a summarized representation of this situation, in which the paths of the aircraft are represented in 2D in the space of the air sector. This first situation is relatively uncomplex because many paths are substantially parallel.

The graph 720*a* represents the cumulative total energy percentage per index of principal components. The horizontal axis represents the index of the current component and the vertical axis represents the cumulative energy of the components, from the first component to the current component, as a percentage of the total. For example, the point 721*a* signifies that the $1^{st}$ component concentrates only 30% of the total energy on itself, the point 722*a* signifies that the first two components concentrate slightly less than 50% of the total energy on themselves, etc.

In this example, the point of inflection at which the derivative of the total energy is less than the fixed threshold corresponds to the point 723*a*, and therefore to the $3^{rd}$ component. This signifies that the components starting from the $4^{th}$ contribute little to the total energy.

The index $k_{max}$ beyond which almost all of the energy is concentrated corresponds to the $11^{th}$ component 724*a*.

It may therefore be seen that, in this uncomplex situation, only 3 components contribute significantly to the total energy. The value of the complexity index is calculated as 0.63402.

FIG. 7*b* represents a second application of this calculation, to a second ATC situation.

The illustration 710*b* represents the 2D paths of the aircraft in this situation, on the same principle as the illustration 710*a*.

This second situation, although comprising the same number of paths as the first situation, is more complex because the paths cross over much more frequently.

This therefore makes the information of the pairs of paths, as integrated into the matrix 600, more complex and the energy is concentrated on a large number of principal components.

The illustration 720*b* represents the variation of the total energy per principal component, on the same model as the illustration 710*b*.

In this case, the point of inflection for which the derivative of the total energy is less than the predetermined threshold is obtained at the point 721*b* corresponding to the $8^{th}$ component, and the index $k_{max}$ beyond which almost all of the energy is concentrated corresponds to the $13^{th}$ component 722*b*.

In this case, 8 components therefore contribute greatly to the total energy, and the calculated complexity index is equal to 0.81686, and is therefore greater than that of the first situation.

These two examples demonstrate the capacity of the invention to calculate a situation complexity index which properly takes into account the situations of possible conflicts between the paths, and not only the number of paths on the sector.

The method 400 comprises many advantages.

As explained above, it provides a reliable compatibility index taking into account the situations of possible conflicts between the paths, and not only the number of paths on the sector.

Furthermore, it does not require a training phase and is based on a limited number of input data.

Finally, each of the steps of the method 400 may be carried out by relatively simple calculations in a deterministic way. The method 400 may therefore be executed in a restricted time on limited calculation capacities. The overall algorithm complexity of the method 400 is low compared with the known methods for determining the processing complexity of an ATC situation.

The method 400 thus makes it possible to redefine ATC sectors in real time in order to adjust the workload of the air traffic controllers.

Finally, the results provided by the method 400 are explainable. The method 400 is therefore capable of being certified.

The examples above demonstrate the capacity of the invention to calculate the processing complexity of an ATC situation, providing it reliably in a restricted time while requiring limited calculation capacities. They are, however, only given by way of example and in no way limit the scope of the invention as defined by the following claims.

The invention claimed is:

1. A method of calculating a complexity index of an air traffic situation, the method being implemented in an air traffic control system comprising a calculation unit, the air traffic situation being defined by an air sector and a time period, wherein the method comprises:

receiving, by the calculation unit, for the air traffic situation, a set of input parameters being related to the air traffic situation on said air sector, and comprising paths of one or more aircraft crossing the air sector during said time period, said paths being defined by a set of path parameters comprising at least positions of the one or more aircraft;

calculating, by the calculation unit, for each of the aircraft paths, path parameters, at each time increment among a set of given time increments;

determining, by the calculation unit, pairs of paths corresponding to all possible pairs of paths among said aircraft paths;

forming by the calculation unit, a matrix comprising, for each of said determined pairs of paths and each time increment, values of the path parameters of each path of the pair;

applying, by the calculation unit, a transformation to said matrix, which provides a transformed matrix comprising components, said transformation having a property of concentrating energy per component;

calculating, by the calculation unit, the energy of components of said transformed matrix; and calculating, by the calculation unit, a complexity index of the air traffic situation, as a function of a concentration level of energy of components of said transformed matrix, wherein the method comprises controlling air traffic from the calculated complexity index.

2. The method as claimed in claim 1, wherein said calculation, for each of the aircraft paths, of path parameters corresponding to positions of the aircraft, at each time increment, consists in interpolating the positions of the aircraft over the paths.

3. The method as claimed in claim 1, wherein:

each row of the matrix represents a pair of paths; and columns of the matrix respectively represent, for each successive time increment, the values of each of the parameters of the paths for each path of the pair.

4. The method as claimed in claim 1, wherein the concentration level of the energy is defined by a number K of components concentrating a ratio of total energy greater than or equal to a predefined threshold.

5. The method as claimed in claim 1, wherein the calculation of the complexity index comprises determining an index k of the last component for which a derivative of an overall energy level of the components is greater than or equal to a predefined threshold.

6. The method as claimed in claim 5, wherein the complexity index C is calculated according to the following formulae:

$$C = \frac{k}{k_{max}} * [1 - (E_{c\_k} - E_{c\_(k-1)})], \text{ or}$$

$$C = \frac{k}{k_{max}} * \left[1 - \frac{(E_{c\_(k+1)} - E_{c\_(k-1)})}{2}\right]$$

where:

the components are arranged by increasing energy, according to an index k=[1 . . . . N];

$E_{c,k}$ represents the sum of the energy of components, from index 1 to index k;

k is the index of the last component for which the derivative of the total energy of the components is greater than or equal to a predefined threshold;

$k_{max}$ is the index of the component for which the sum of the energies is greater than or equal to a predefined threshold of the total energy of the components.

7. A non-transitory computer readable medium comprising a computer program comprising machine readable instructions that, when executed by a processor, performs the steps of a method as claimed in claim 1 when said program is executed on a computer.

8. The method as claimed in claim 1, wherein the components of the transformed matrix are ordered by increasing energy.

9. The method as claimed in claim 1, wherein said transformation is performed by implementing a principal component analysis (PCA) or an independent component analysis (ICA).

10. The method as claimed in claim 1, wherein said given time increments are determined by sampling a duration of the air traffic situation by regular time increments as a function of a target duration of the time increments or by dividing the duration of the air traffic situation by a predefined number of time increments.

11. An air traffic control system comprising at least one calculation unit configured to calculate a complexity index of an air traffic situation, being defined by an air sector and a time period, wherein the system comprises:

at least one input port capable of receiving a set of input parameters being related to the air traffic situation, and comprising, paths of one or more aircraft crossing the air sector during said time period, said paths being defined by a set of path parameters comprising at least positions of the aircraft;

wherein said at least one calculation unit is configured to:

calculate, for each of the aircraft paths, path parameters, at each time increment among a set of given time increments;

determine pairs of paths corresponding to all possible pairs of paths among said aircraft paths;

form a matrix comprising, for each of said determined pairs of paths and for each time increment, values of the path parameters of each path of the pair;

apply to said matrix a transformation, which provides a transformed matrix comprising components, said transformation having a property of concentrating energy per component;

calculate the energy of components of said transformed matrix; and calculate a complexity index of the air traffic situation, as a function of a concentration level of the energy of components of said transformed matrix, wherein the system is adapted to control air traffic from the calculated complexity index.

12. The system as claimed in claim 11, wherein the at least one calculation unit is configured to dynamically redefine the sectors of an airspace, on a basis of complexity indices of the air traffic situation which are iteratively calculated.

13. The system as claimed in claim 12, wherein the at least one calculation unit is configured to solve a problem of constraint optimization, consisting in minimizing a total number of sectors on an airspace under the constraint that the air traffic complexity index calculated, at each iteration, corresponding to one of said sectors and a time period, is less than a predefined complexity.

* * * * *